June 2, 1936. E. C. HORTON 2,042,898
WINDSHIELD CLEANER
Filed Dec. 14, 1932 2 Sheets-Sheet 1
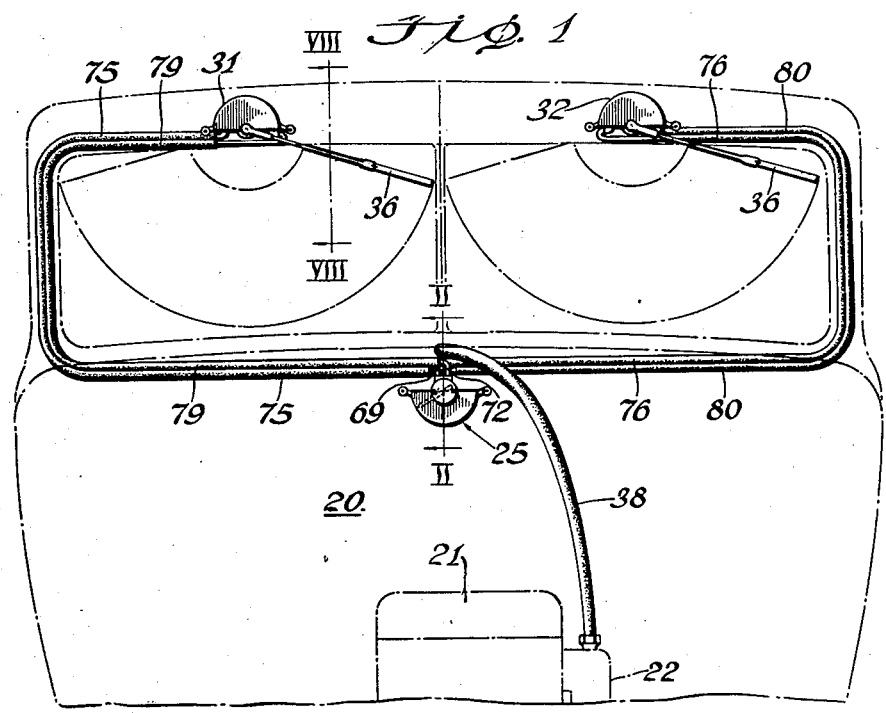
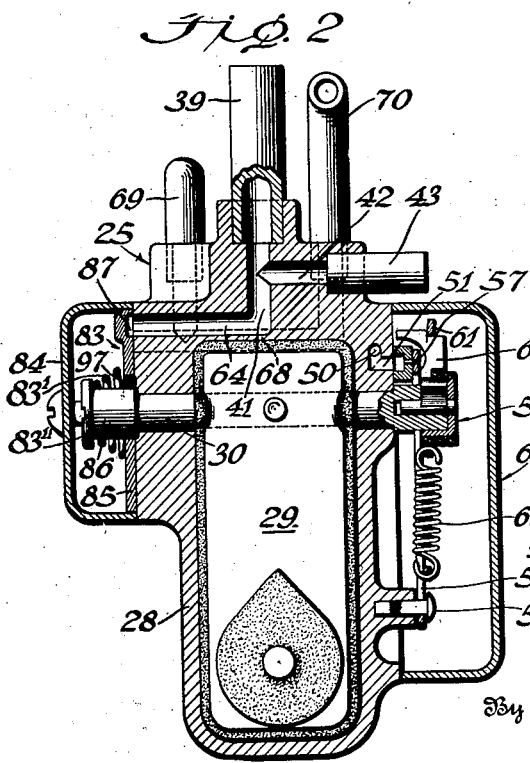
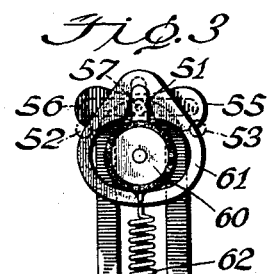
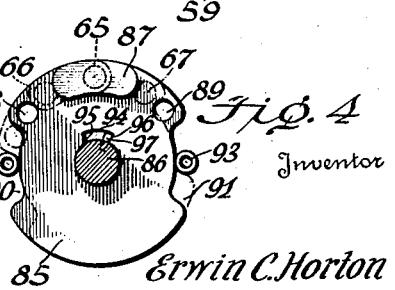
Inventor
Erwin C. Horton
By Beau & Brooks
Attorneys

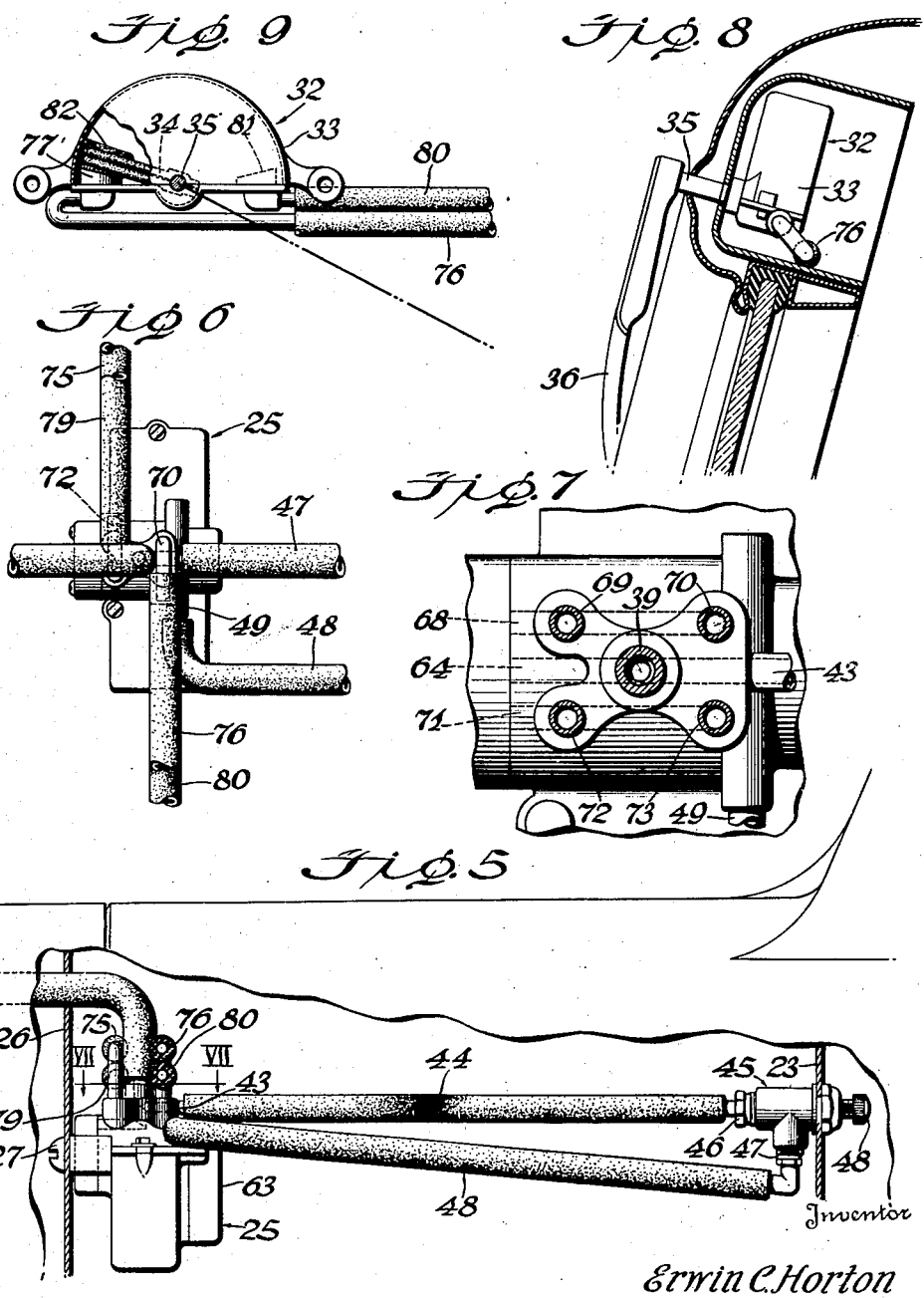

Patented June 2, 1936

2,042,898

UNITED STATES PATENT OFFICE 2,042,898

WINDSHIELD CLEANER

Erwin C. Horton, Hamburg, N. Y., assignor to Trico Products Corporation, Buffalo, N. Y.

Application December 14, 1932, Serial No. 647,280

2 Claims. (Cl. 60—97)

This invention relates to automatic windshield cleaners and more particularly to that type of cleaner in which the wiper is moved back and forth across the driver's line of vision.

In the windshield cleaner art various means have been provided heretofore for cleaning the windshield glass of an automotive vehicle, and it has always been the object of these various cleaners to clear the glass in the most efficient manner, but where the wiper constantly moves back and forth across the field of vision such motion becomes monotonous to the driver.

The present invention has for an object to provide a windshield cleaner which will overcome the difficulties and disadvantages inherent in the present wipers of this type and will provide a wiper action less tiring and annoying to the driver.

Another object is to provide a means for effecting a motion to the wiper in which there is a definite rest or dwell at the end of each stroke across the glass.

Another object of this invention is to provide a method and means for operating a wiper in which the wiper is under the direct control of a primary or master means.

A further object is to provide a means by which plural wipers will operate in synchronism, either in phase or in opposition, under the control of a master operator.

Still another object is to provide a means for operating a plurality of wipers, which means will be applicable to windshields of various types and designs, including the present V-type.

Further, the invention will be found to reside in the arrangement and combination of parts and their salient features of construction hereinafter described and claimed, reference being had to the accompanying drawings wherein:

Fig. 1 is an elevational view of one embodiment of the invention, with a phantom showing of the motor vehicle on which it is mounted;

Fig. 2 is a sectional view about on the line II—II of Fig. 1 illustrating the master motor;

Fig. 3 is a front elevation of the snap valve for controlling the operation of the master motor (shown in dead center position);

Fig. 4 is a front elevation of the valve controlling the operation of the dependent motors (also shown in neutral position);

Fig. 5 is a side elevation of a portion of a motor vehicle equipped with the present invention, with parts broken away to show the mounting of the master motor and the operator's control valve therefor;

Fig. 6 is a plan view of the master motor, showing the arrangement of the conduits leading from the master motor to the source of suction, the dependent motors, and the operator's control valve;

Fig. 7 is a sectional view about on the line VII—VII of Fig. 5;

Fig. 8 is a sectional view through the motor vehicle header, and taken about on the line VIII—VIII of Fig. 1, showing the mounting of a dependent motor; and Fig. 9 is an elevation of a dependent motor with parts broken away to show the piston in a parked position.

Referring more in detail to the accompanying drawings an automotive vehicle 20, having an internal combustion engine 21 and an intake manifold 22, is equipped with a windshield cleaner embodying the present invention. Below the cowl, and in a suitable position behind the instrument board 23, a master or primary motor 25 is mounted. As illustrated in Fig. 5, it may be attached to the dash 26 by any suitable means such as screws 27. This master motor 25 may be of any desired type of drive although in the present showing it is of the fluid pressure or so-called suction operated type, and comprises generally a casing 28, and a piston 29 mounted for oscillation therein about a shaft 30 connected thereto and journalled in a conventional manner in the casing 28.

Mounted in the vehicle header are two secondary or dependent motors 31 and 32, so called because they have no power applying means incorporated in their mechanism, but are dependent upon a primary or master motor for the operative application of their fluid pressure impulses, in this case the master motor 25. These several motors may be of the vane piston type, and each of the secondary motors comprises a casing 33, and a piston 34 which is operatively attached to a shaft 35 for oscillation in the casing 33. A wiper 36 is carried by each of the shafts of the motors 31 and 32, for oscillatory wiping movement across the windshield of the motor vehicle 20.

Suction for the operation of the master motor 25 may be obtained from any convenient source, such as the intake manifold 22 of the internal combustion engine 21. As shown in Fig. 1, the motor 25 is connected to the intake manifold 22 by means of a conduit or suitable piping 38, which runs from said intake manifold to a nipple 39 in the motor casing 28, said nipple 39 opening into a vertical duct or passage 41. Extending in a horizontal direction and starting at the vertical duct 41 is another passage 42 which opens into a nipple 43. A tubing 44, of rubber or other suitable material, connects the nipple 43 with an operator's control valve 45, which is mounted on the instrument panel 23. This valve is of a conventional type comprising an inlet fitting 46, an outlet fitting 47, and a manually operable screw 48 which controls the fluid flow through the valve. A rubber or metal conduit 48 connects the outlet fitting 47 of the control valve 45 with the master motor through a nipple 49, which leads to a passage 50, said passage 50 containing a right angle bend and terminating at the outside of the casing in a port 51. It can readily be seen that by means of the above described course, the port 51 has direct communication with the source of suction, and the application of fluid pressure to the motor is under the control of the operator of the motor vehicle.

In conjunction with the suction port 51, there are two other ports 52 and 53, as indicated in dotted lines in Fig. 3, which lead into the casing at opposite sides of the vane piston. These three ports 51, 52 and 53 make up the usual three port system of the modern windshield cleaner motor. Admittance of suction to either side of the piston is controlled by means of a valve mechanism which will be generally designated as 54. The particular mechanism depicted here is of the type described in application Serial No. 633,182 of Anton Rappl, filed September 14, 1932. Briefly, it comprises a valve member 55 which engages the valve seat about the ports 51, 52 and 53. On the under side of the valve is a channel 56 which is continuously in communication with the suction port 51 and alternately in communication with either port 52 or 53, depending upon the position to which it has been moved about the axis of a pintle 57 carried by it. The pintle is substantially axial of the port 51 and engages in an opening formed in a supporting frame or pressure plate 58, said pressure plate extending around the shaft 30 and a pin 59 anchored in the casing. Slidably engaging the end of the shaft 30 is a kicker member 60 which carries a stirrup 61. The kicker member is given partial movement by the shaft 30 and it directly controls the movement of the valve member 55. A snap action is obtained by means of a tension spring 62 that is operatively attached between the stirrup 61 and the pressure plate 58. The entire valve mechanism above described is covered by a cap 63, said cap engaging the motor casing in such a manner as to allow the atmosphere to enter, thus permitting the proper operation of the master motor.

Extending from the end of the vertical passage 41 in a horizontal direction is a passage 64 which terminates at the left hand face of the casing (Fig. 2) in a port 65. Two ports 66 and 67, at the left and right respectively of port 65, as shown in Fig. 4, have passage connections with two pairs of elbowed nipples mounted in the head of the motor casing, the passage 68 establishing communication with elbows 69 and 70, and the passage 71 making connection with elbows 72 and 73. Two conduits 75 and 76, of rubber or other suitable material, connect the elbowed nipples 69 and 70 with the dependent motors 31 and 32 through parking ports 77 at the left hand sides of their pistons. Similarly, two conduits 79 and 80 connect the nipples 72 and 73 respectively with the motors 31 and 32 through parking ports 81, at the right hand sides of their pistons.

Taking the secondary or dependent motor 32 as viewed in Fig. 9, as a typical embodiment of what has been termed a "dependent" motor, it has been previously described that such motor comprises a casing 33, and a piston 34 mounted for oscillation in said casing about the axis of a shaft 35 to which it is attached. To the left of the piston is a port 77 and to the right is a port 81, both of said ports opening through seats to be engaged by the piston or a valve piece 82 carried by the piston on each side thereof. Such a construction comprises what is commonly known as a "parking port", and by having one port on either side of the piston a means is provided for parking the wipers at either of the limits of their movement, although aside from this use the ports here shown are desirable for the operating applications of the fluid pressure impulses. This parking action insures the proper holding of the piston to place the wipers in a parked position and further closes the port to the entire piston surface.

In order to make correct and properly timed applications of fluid pressure to the dependent motors 31 and 32, through the above described system of conduits, a pressure applying or distributing valve mechanism 83 is provided which is operated by the master motor shaft 30, and is housed at the left end thereof (Fig. 2) in a cap 84, said cap being of such a construction that atmospheric pressure will at all times prevail on its inner side. As shown in Figs. 2 and 4, the valve mechanism may comprise a partially circular valve member 85 mounted slidably on an enlarged portion 86 of the motor shaft 30 and held against its seat by a spring 83', said spring being held in position by a large headed screw 83". An arcuate groove or channel 87 is pressed or otherwise formed in one side face of the valve member 85, which is continuously in communication with suction port 65 and alternately in communication with either port 66 or 67, depending upon the position to which it has been moved about the axis of the motor shaft 30. On either side of the channel 87 and adjacent the periphery of the valve member are two atmospheric ports or openings 88 and 89, corresponding in dimensions with the ports 66 and 67 respectively. These openings are so positioned that when the channel portion is connecting two ports, 65 and 66 for example, the remaining port 67 will be in registry with the opening 89. When the channel connects ports 65 and 67, opening 88 is in registry with port 66. Opposite sides of the valve member are symmetrically recessed, as at 90 and 91, to form shoulders which will abut stop members 92 and 93, as the valve is oscillated back and forth, thus giving it a limited movement and assuring proper registry of the various ports and the channel.

The valve member is formed with a segmental recess 94 having end faces or shoulders 95 and 96. In conjunction with the recess 94 is a pin 97 which is mounted on the motor shaft to move therewith, so that it will engage the respective faces of the recess as the shaft oscillates back and forth under movement of the piston 29. By this means an intermittent oscillatory motion is given to the valve member 85, which will in turn cause intermittent fluid pressure impulses to be transmitted to the secondary motors.

In operation, the internal combustion engine is functioning in its normal manner and thus maintaining a suction, or below atmospheric pressure, in the intake manifold 22, which suction is present in the windshield cleaner system up to the operator's control valve 45 by means of the conduit 38, passages 41 and 42 and conduit 44. When the control valve 45 is opened by the operator, air is drawn into the intake manifold through the port 51, passage 50, conduit 48 to the control valve and thence to the intake manifold 22. This will start the oscillation of the piston 29 of the master motor, and accordingly the shaft 30 will oscillate back and forth.

Assuming that before the operator has started the master motor the valve 85 is in the position shown in dot and dash lines in Fig. 4, having been moved to this position by the piston 29 as it moved to the right (Fig. 1), suction will also be maintained in the cleaner system including the dependent motors 31 and 32, by means of the passage 41, passage 64, channel 87, port 66, passage 68, nipples 69 and 70, and through conduits 75 and 76 to the secondary motors by means of the ports 77. With the valve 85 in this position sub-atmospheric pressure will be present on the left hand side of the piston 34, (Fig. 9) and since the port 67 will then be open to the atmosphere, atmospheric pressure present in the casing to the right of the piston will hold said piston in the position shown in Fig. 9 with the flap 82 seating on the port 77. However, when the operator opens the control valve 45 the piston will start to move toward the left hand side of the master motor casing. In so doing the shaft 30 will start to move with it in a clockwise direction, and because of the loose fit of the valve 85 on said shaft, said valve will be unaffected by this motion until the pin 97 moving in the notch 94 engages the end portion 96 of said notch. The pin 97 will then move the valve 85 in a clockwise direction to the limit of its movement when the channel 87 of the valve will connect ports 65 and 67. With the valve in this position suction will prevail on the right hand side of the secondary motors by means of the passage 71, nipples 72 and 73, conduits 79 and 80, and the ports 81. The port 66 will then be open to the atmosphere and hence the pistons will be pushed to the other side of the casings into engagement with ports 81. The piston 29 will then start its return movement, not affecting the valve until the pin 97 comes in contact with the end portion 95 of the notch. Such contact starts the valve in counter-clockwise movement to the dot and dash showing in Fig. 9; and another cycle of operation has commenced.

It is to be specially noted that when the valve 85 is in one of its limit positions, it will stay in that position for a given length of time during which the master piston is moving toward its opposite limit of travel. Likewise, the wipers, after they make their quick stroke, will remain in a rest position at one side of the cleared area while the master piston is so moving. The motion thus given to the wipers will be as follows: They will be in a rest or dwell position to start with, and remain in that position for a regulatable interval of time, as determined by the controlled movement of the master motor, following which they will move directly to its dwelling position on the other side of the cleared area; here they will again rest for a regulated interval, and then again start to move to the initial position. In other words, there is an intermittent wiper movement in which each movement is a complete stroke followed by a dwell or rest period which is as long as the time required for the master piston 29 to complete its stroke. Since the movement of piston 29 is controlled from the operator's valve 45 this movement may be fast or slow and accordingly shorten or lengthen the interval of rest. The wiper movement however will be quick since this is not under the control of the operator. Thus, each wiper movement will be quick, followed by a long or short rest interval, and therefore the field of vision will be cleared before the driver by a quick movement practically unnoticeable as compared with the intervening dwell or rest period.

It is to be further noted that with the particular arrangement shown in the accompanying drawings and herein described, the wipers will move in phase synchronism, that is, they will both move in the same direction at the same time. However, simply by changing the conduit connections to the elbowed nipples 69, 70, 72 and 73, the wipers could be made to move in phase opposition to each other, or in other words, they would both move at the same time but while one is moving to the right, the other will be moving to the left, and vice versa.

Inasmuch as no rigid connection is used between the two dependent wiper motors as a means of actuating the two wipers in synchronism, it will be evident that this invention will lend itself readily to the V-shaped windshield as illustrated in Fig. 1, or any other windshield having the glasses at different angles or not in the same plane.

Although only one form of the invention has been shown and described in detail, it will be apparent to those skilled in the art that the invention is not so limited but that various changes may be made therein without departing from the spirit of the invention, or the scope of the appended claims.

What is claimed is:

1. A windshield cleaner comprising a master motor, dependent motors spaced from one another and dependent upon the motor for their operation, said master motor having a mechanism operatively connected thereto for applying power thereto to operate said master motor, a single means in addition to said mechanism and common to said dependent motors and operatively connected to the master motor for being operated thereby to connect said dependent motors to a source of power, and a play connection between said single means and the master motor to permit idling movement of the latter independent of said dependent motors.

2. A windshield cleaner comprising a cleaner motor having a casing and a piston therein, there being ports establishing communication with the casing at opposite sides of the piston, a second motor having a casing, a piston operable in the latter, a piston connected shaft journaled at its opposite ends in the casing of the second motor, a valve mechanism operatively connected with one end of the shaft for operatively applying fluid pressure to said second motor to oscillate said shaft, a valve for alternately connecting the ports of the first motor to a pressure supply port, which pressure supply port is adapted for connection to a source of fluid pressure, said valve operating to connect such source to the first motor first at one side of the piston and then at the opposite side thereof, and a play connection between said valve and the opposite end of said shaft for operation by the latter after an idling movement of said shaft.

ERWIN C. HORTON.